United States Patent [19]

Huntley et al.

[11] 4,393,459

[45] Jul. 12, 1983

[54] STATUS REPORTING WITH ANCILLARY DATA

[75] Inventors: John D. Huntley; Raymond L. Parsons, both of Tucson, Ariz.

[73] Assignee: International Business Machines Corp., Armonk, N.Y.

[21] Appl. No.: 169,544

[22] Filed: Jul. 17, 1980

[51] Int. Cl.³ .................. G06F 13/00; G06F 15/16
[52] U.S. Cl. ............................................ 364/900
[58] Field of Search ... 364/200 MS File, 900 MS File

[56] References Cited

U.S. PATENT DOCUMENTS

| | | | |
|---|---|---|---|
| 3,405,394 | 10/1968 | Dirac | 364/200 |
| 3,528,061 | 9/1970 | Zurcher, Jr. | 364/200 |
| 3,725,872 | 4/1973 | Balogh, Jr. et al. | 364/200 |
| 3,798,591 | 3/1974 | Phillips et al. | 364/200 |
| 4,089,052 | 5/1978 | Gruner | 364/200 |
| 4,096,571 | 6/1978 | Mey | 364/200 |
| 4,099,243 | 7/1978 | Palumbo | 364/200 |
| 4,115,851 | 9/1978 | Nogono et al. | 364/200 |

OTHER PUBLICATIONS

IBM Tech. Discl. Bull., "Executing a Reserve/Release on Sub-Device Data Increments in a DASD System", Brook et al., vol. 19, No. 8, Jan. 1977, 3219-3221.

*Primary Examiner*—Eddie P. Chan
*Attorney, Agent, or Firm*—Herbert F. Somermeyer

[57] ABSTRACT

Resources shared by plural users supply a busy signal to a requesting user whenever any one of the users has a right of access to the resources. Ancillary data accompanies the busy signal identifying the user having the right of access. The requesting user may use the ancillary data to adjust its right of access by communication with the one user. The right of access may include a queue of access requests, each request having the ancillary data.

1 Claim, 12 Drawing Figures

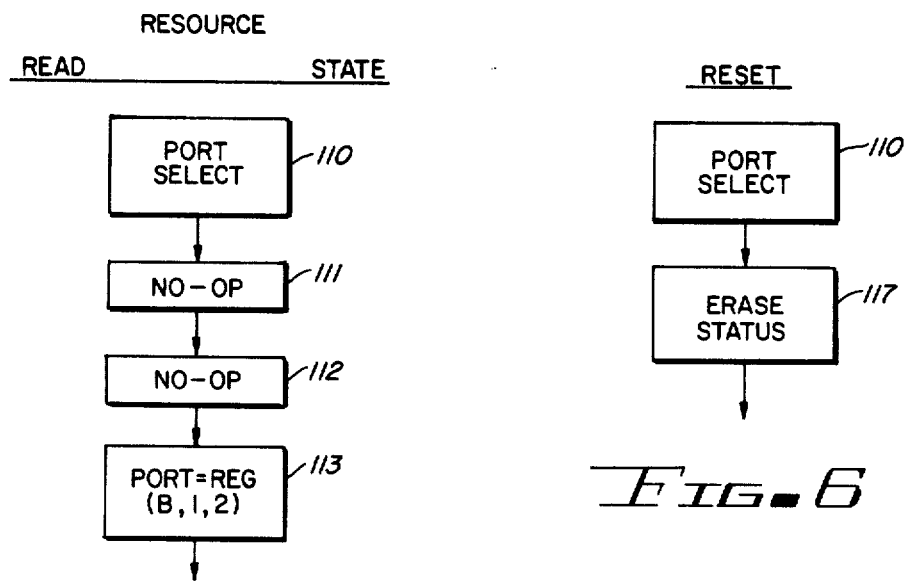
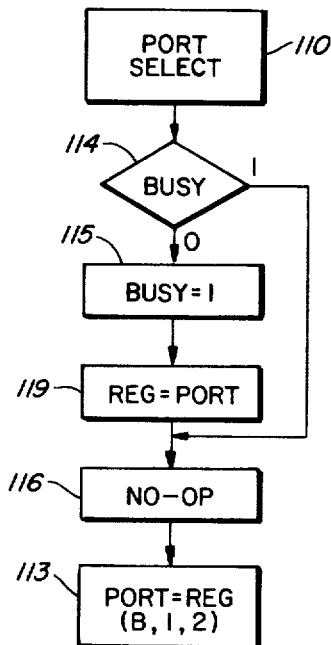
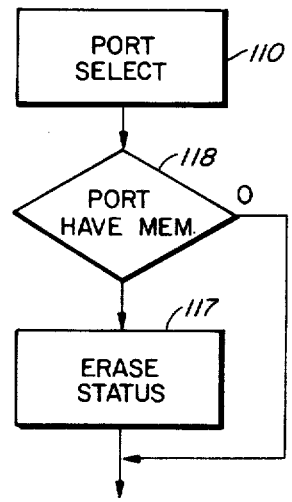

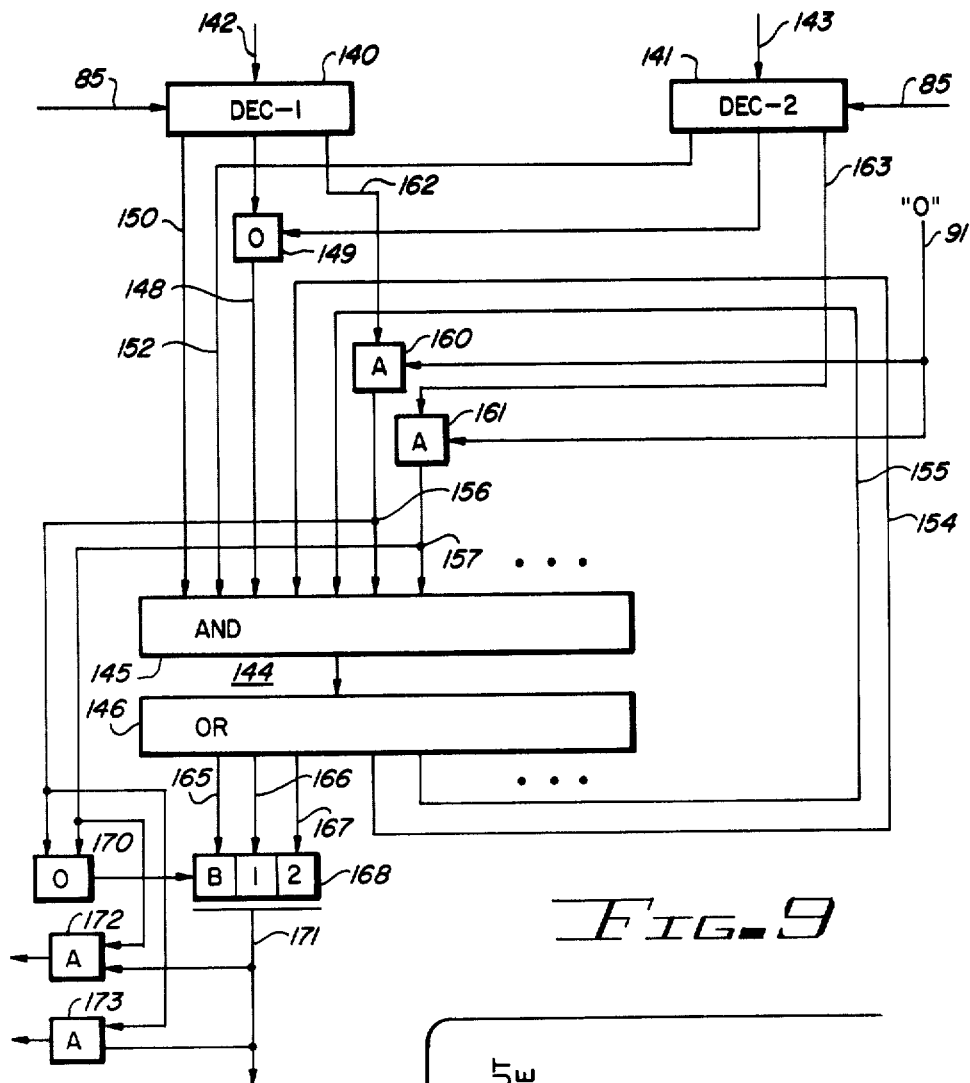
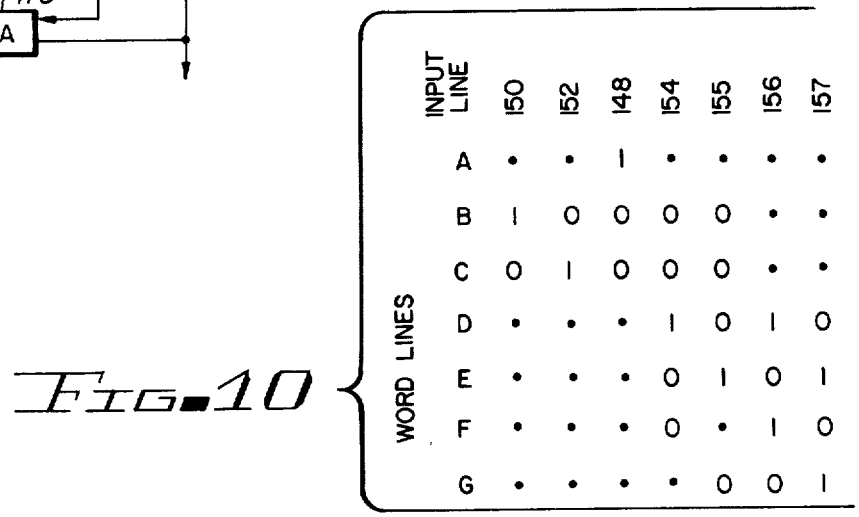

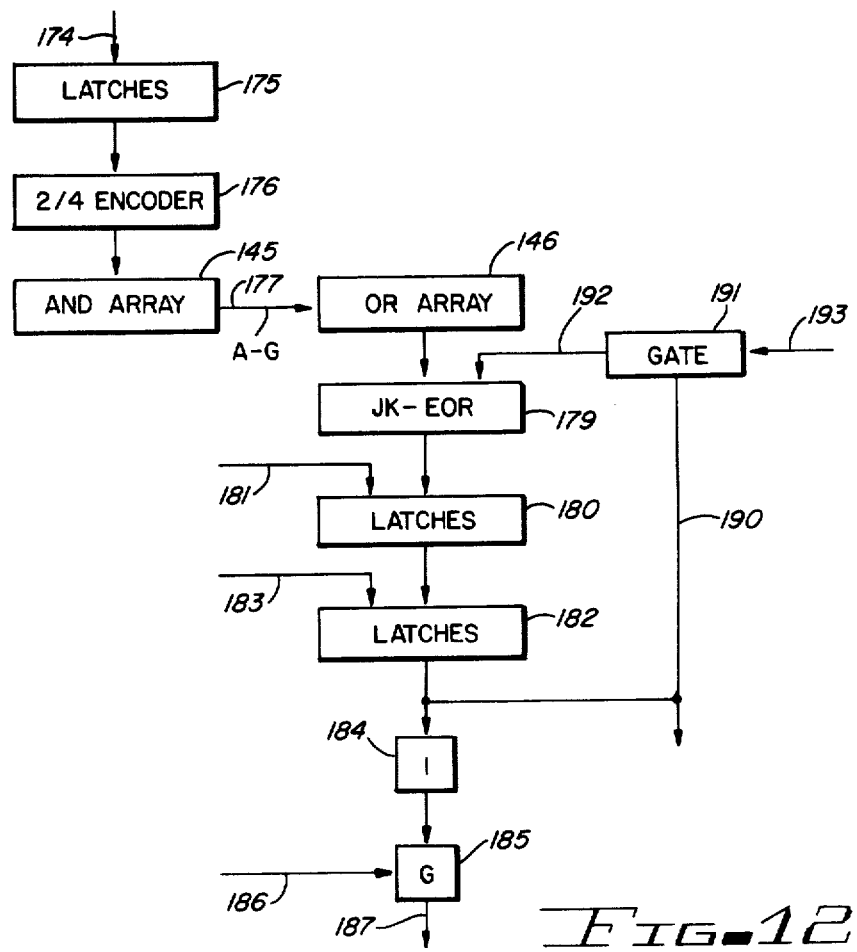

STATUS REPORTING WITH ANCILLARY DATA

BACKGROUND OF THE INVENTION

The present invention relates to data processing systems employing shared resources; more particularly, to an enhanced control of said shared resources for enabling more flexible data-processing systems operations while ensuring data integrity.

In data processing systems, many peripheral equipments are shared between a plurality of hosts (central processing units). Even if a single unit of peripheral equipment is attached to but one host, a plurality of independent computer processes performed within that host on a multi-processing basis may desire to share the peripheral equipment. Further, in multi-host data processing sites, a single peripheral device may be shared through a single host by a plurality of hosts connected to the single host. Examples of such shared peripheral equipment are of the peripheral data storage apparatus such as magnetic storage tape apparatus, magnetic disk apparatus, optical storage apparatus of all types, printers of all types, communication equipment including concentrators, modems, terminals, and all other sorts of equipment that can be connected to and used in connection with a data processing system.

In a plural-host data-processing system, the host, in addition to communicating with peripheral equipment, also employ what is termed in this application "lateral communications" between the hosts. This lateral communication includes direct host-to-host signal transfers. Such networking in a multi-host data processing system facilitates multi-pathing and enables better control and efficiency of a multi-processing multi-host system that can be interactive to various degrees. When such systems employ shared resources, the domination of a shared resource, such as a peripheral equipment, by one host to the exclusion of other hosts or by one process to the exclusion of other processes can cause degradation of overall data-processing system's performance. Such degradation can be caused by error conditions as well as a process or host that in its normal day-to-day operations tends to dominate a given peripheral equipment. Such limited access results in access "contention". In such a multi-unit data processing system, resolution of contention in an efficient manner can improve data processing performance. Lateral communications can facilitate error condition analysis for minimizing throughput degradation, particularly as enhanced by the present invention.

Accordingly, peripheral equipment that are shared resources, as well as other forms of shared resources, should provide for more efficient contention resolution and error analyzation such that utilization of shared resources can be maximized by its connected data processing system. Since multi-pathing can raise questions of data integrity, such shared resource should enable an additional check on the operation of such shared resource for giving an added confidence level to data integrity of the data handled by the shared resource, particularly when that shared resource is storage apparatus.

SUMMARY OF THE INVENTION

It is an object of the present invention to provide shared resource apparatus and methods which supply status signals for facilitating contention resolution and adding data integrity indications.

Shared resources, in accordance with one aspect of the invention, supply shared resource availability status signals, such as a busy or not busy status signal, to a requesting unit together with ancillary identification data which enables the requesting unit to analyze contention problems and error conditions. Such ancillary identification data is preferably an identification of a host or other unit that is presently accessing the shared resource, i.e., the units that cause the busy status of the shared resource. Such ancillary identification data indicate the reason for denial of access indicated by the availability status signal.

In a given aspect of the invention, a control for a shared resource capable of being accessed by any one of a plurality of users comprises means for storing current status signals of the shared resource together with identification signals indicating a current user of the shared resource, means for receiving request signals from diverse users and means responsive to the received request to supply the current status and current user identification signals to the requesting user. The requesting user may be the user that is currently accessing the shared resource such that that current user can verify the resource is still assigned to such current user. This latter action is a data integrity aspect of the invention.

In other aspects of the invention, the identification of the user can be an immediate user; i.e., a user that is directly connected to the shared resource and directly accesses the shared resource. In the alternative, such identified user can be a remote user, such as a computer process or a host computer connected to the shared resource through an intermediate user. Current status and current user identification not only includes a current actual accessing user but in the event of queued commands, the current status can include the status of the queue of commands to be executed with identification of the user for each command in the queue.

The foregoing and other objects, features and advantages of the invention will be apparent from the following more particular description of preferred embodiments of the invention, as illustrated in the accompanying drawings.

THE DRAWING

FIGS. 4–7 are flow charts illustrating control logic flow in an access control employing the invention showing control and access to current status in a preferred embodiment of the invention as illustrated in the higher numbered figures of this application;

FIGS. 9, 10 and 11 illustrate a programmed logic array control usable in a portion of the FIG. 8 illustrated preferred embodiment;

FIG. 12 is a block diagram of a program logic array usable to implement the PLA illustrated in FIGS. 9–11.

DETAILED DESCRIPTION

Figure 1:
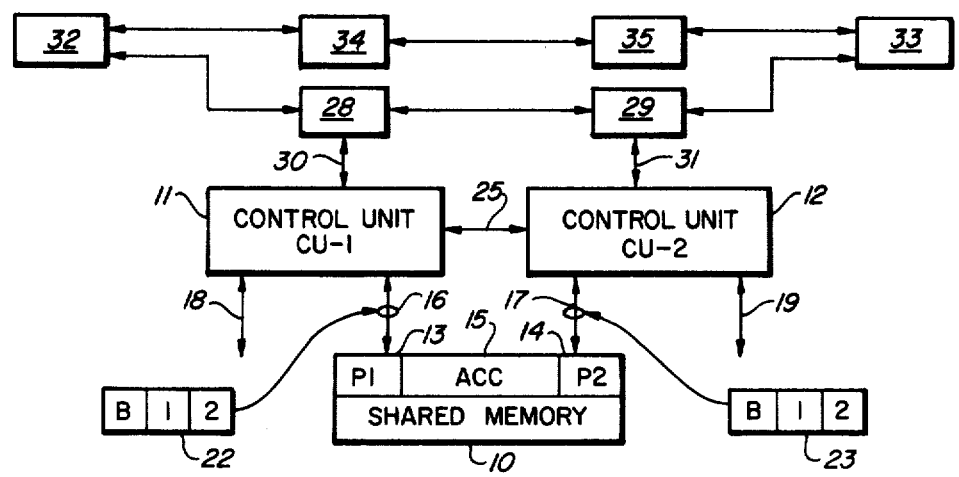
FIG. 1 is a block diagram of a data processing system employing the present invention.

Referring now more particularly to the drawings, like numerals indicate like parts and structural features in the various diagrams. In FIG. 1, shared memory 10, a semiconductor random-access memory, is accessed by either control unit 11 or control unit 12 hereinafter denominated CU1 and CU2. Shared memory 10 has first and second accessing ports P1, P2 denominated by numeral 13, 14. Contention for shared memory 10 between CU1 and CU2 is handled through accessing control circuit 15 hereinafter denominated ACC 15. ACC 15 communicates with CU1 and CU2 via P1 and P2. In addition to CU1 and CU2 accessing shared memory 10 for providing communication between the two control units, CU1 and CU2 have a processor to processor communication link 25. In this regard, each CU1 and CU2 have a microprocessor controller hereinafter referred to as processor which executes programs for accessing shared memory 10 and providing transfer of signals between shared memory 10 and a plurality of hosts hereinafter described. Such program execution by the two processors (not shown) in CU1 and CU2 can require close coordination, hence the lateral communication provided by link 25. Link 25 includes such lateral communications completed via a message area in the shared resource 10 or another shared memory. The construction of memory control units such as CU1 and CU2 and their lateral communication link 25 is sufficiently well known that further description is dispensed with.

CU1 and CU2 are respectively connected to ports P1 and P2 via input/output cables 16 and 17. The control units may also be connected to other units, (not shown) which may or may not be shared such as indicated by cables 18 and 19, respectively.

Shared memory 10 supplies current status signals with ancillary identification data signals to either control unit 11 or 12 in response to a request by the respective control unit for access to shared memory 10. For example, P1 supplies the signals indicated by numeral 22 to CU1. When CU1 requests access to shared memory 10 but access is denied, then status of shared memory 10 together with ancillary identification data are supplied to CU1 over cable 16. Such current status information 22 includes a busy bit B which indicates to CU1 that shared memory 10 is either busy or not busy. If it is not busy, it is accessible by CU1. If it is busy, then bits 1 and 2 of the ancillary information indicate to CU1 whether control unit 1 currently has access rights to shared memory 10 or CU2 has current access rights to shared memory 10. If bit 1 is a binary 1, then CU1 has access; if bit 2 is a binary 1 then CU2 has access. If both of bits 1 and 2 are 1's, an error condition has occurred. Neither bit 1 or 2 can be a binary 1 unless the busy bit B is a binary 1. In a similar manner, port P2 supplies current status and ancillary identification data signals 23 (identical to data signals 22) over cable 17 to CU2. CU1 and CU2 can use the ancillary identification data for indicating to hosts, as will be described, the current access status of shared memory 10 plus one error status.

CU1 and CU2 are respectively connected to hosts 28, 29 via input/output channels denominated by the double-headed arrows 30, 31. Hosts 28, 29 can be any suitably programmed central processing units. Hosts 28, 29 also communicate to each other directly as indicated by the unnumbered double-headed arrow. Additionally, other hosts 32, 33, 34, 35 are connected to hosts 28, 29 either directly or indirectly as shown in the drawing by the unnumbered double-headed arrows. These additional hosts 32–35 may also access shared memory 10 via hosts 28, 29. Accordingly, even though the identification data supplied with the busy bit in the status information 22, 23 is limited, it still provides an enhanced capability of CU1 and CU2 to provide status information to host 28, 29 for contention resolution and data integrity indications, as well as shared memory error conditions. As will become apparent, this simple fundamental concept can be extended by adding more complete ancillary identification signals to more complex situations for adding greater enhancement in contention resolution and data integrity indications, particularly in alternate path recovery and alternate path directing systems.

Figure 2:
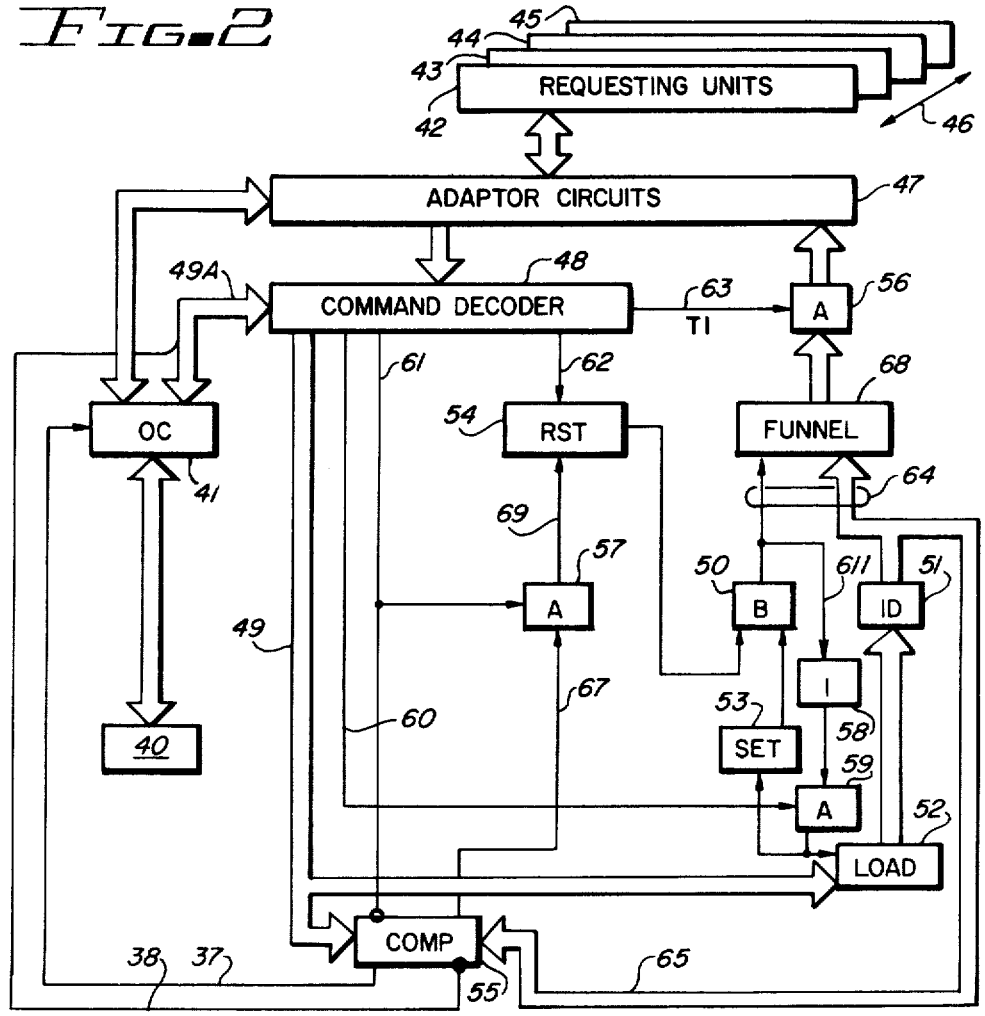
FIG. 2 is a logic diagram of a first implementation of the invention illustrating the control circuits of a shared resource used to implement the invention.

FIG. 2 illustrates an implementation of the invention for connecting four users 42–45 through a single port on a time shared basis to shared resource 40, which can be a plurality of shared devices or memories. Other circuits 41; i.e., those circuits usually associated with controlling a storage apparatus, are connected to shared resource 40 for providing data transfers between shared resource 40 and any one of the users or requesting units 42, 43, 44 or 45. Such data transfers are well known. In addition to communicating with shared resource 40 through other circuits 41, requesting units 42–45 have lateral communications between themselves for coordinating a highly interactive programmed environment, such lateral communication being indicated by double-headed arrow 46. The details of these lateral communications are not important to an understanding of the invention but are of interest in illustrating how the invention can be applied for facilitating operations in a highly interactive data processing environment.

To attach the requesting units 42–45 to shared resource 40, a plurality of adaptor circuits 47 provide for the well known communications between a host (requesting units 42–45) and shared resource 40. Once the signals have been processed, and the units selected by one of the port adaptors (not shown) of adaptor circuit 47, decoder 48 receives command signals from one of the requesting units 42–45 that is requesting access to shared resource 40 for determining the action to be taken by the shared resource 40 or its control circuits 41, herein labeled other circuits. Such decoded command signals are supplied over a plurality of signal lines denominated by numeral 49A to other circuits 41 which execute the decoded command. Additionally, decoder 48 decodes those commands that request access and for reading status of shared resource 40. These decoded commands actuate the other illustrated circuits of FIG. 2 which supply the current status of shared resource 40 together with the ancillary identification data signals to one of the requesting units 42–45. The current status of shared resource 40 is stored in a single bit register 50 which includes at least one bit position BUSY for indicating the busy status of shared resource 40. In the event of queued commands, the busy bit register 50 is expanded to contain one bit per command to be queued. Additionally, priority information can be incorporated with the busy status for indicating to a requesting unit the likelihood of its accessing a shared resource 40 based upon its own internal priority operations. ID register 51 contains ancillary identification data signals, one unit of such information for each of the current status signals (busy and queued commands). Such identification data signals can be the respective serial number of the plurality of requesting units, be a bit significant ancillary information as described with respect to FIG. 1 for CU1 and CU2 or can identify a computer process being executed by any one of the requesting units 42-45 or their connected units (not shown). Registers 50 and 51 respectively receive the current status and ancillary identification data signals as described with respect to four commands employed in a best mode of the present invention.

The following description assumes a two-phase clock labeled T0 and T1, which is not shown but is well known in the data processing art. The description of FIG. 2 will follow a broad description of a first command received and decoded by decoder 48; then other commands pertinent to an understanding of the present invention are described with respect to FIG. 2 in an abbreviated form.

The first command described is a so-called READ AND CONDITIONALLY SET. This command corresponds to the flow chart of FIG. 5 which is also later described. Command decoder 48 receives the command from a requesting unit 42-45 via adaptor circuits 47. After decoding the received command at T1, command decode 48 at T0 supplies an active signal, signifying the decoded command, over line 60 and simultaneously supplies the equivalent of ancillary identification data signals on cable 49. These equivalent signals are received by decoder 48 with the received command in a usual manner. The signal contents of the busy-bit register 50 travels over line 611 through inverter 58 to AND circuits 59. If the shared resource 40 is unavailable, i.e. busy, as indicated by the busy bit register 50 equal to a binary 1, then the output of the inverter circuit 58 is an inactive signal disabling AND circuits 59. As a result, load circuit 52, which couples cable 49 to ID register 51, is blocked and no new ancillary identification data is provided to ID register 51. Similarly set circuit 53 for busy-bit register 50 is also disabled.

On the other hand, when shared resource 40 is not busy, i.e. available, then the busy-bit register 50 is in the reset or binary 0 state. As a result, the signal line 61 is inactive; inverter 58 output then becomes active enabling AND circuits 59 to provide an active signal for enabling set circuit 53 to set the busy-bit register 50 to the active condition and simultaneously activate load circuit 52 to transfer the signal contents of cable 49 to ID register 51. At this point in time, shared resource 40 is assigned to the requesting unit that supplied the ancillary identification data on cable 49. At the next clock phase T1, registers 50 and 51 have the new information signifying the assignment of shared resource 40 to such requesting unit. Also at this time, the signal contents of registers 50 and 51 are transferred over cables 64 through funnel circuit 68 to AND circuits 56. Also at T1, line 63 is activated by command decoder 48 enabling AND circuits 56 to transfer the signal contents of registers 50, 51 through adaptor circuits 47 to the requesting unit that supplied the READ AND CONDITIONALLY SET command. From this ancillary information, such requesting unit can determine whether it has gained access to shared resource 40; if the shared resource 40 was busy and which of the requesting units 42-45 are currently operating with shared resource 40. Then by using lateral communications, any priority of operations can be implemented, such priority is beyond the scope of the present description.

The second command used in connection with the FIG. 2 illustration is a so-called READ command. After receiving a READ command, command decoder 48 at T1 activates line 63 enabling AND circuits 56 to transfer the signal contents of registers 50, 51 to adaptor circuits 47 to the requesting unit that sent the READ command. The flow chart of this operation is explained later with respect to FIG. 4. The action of the READ command merely transfers the busy status and the ancillary identification data of register 50, 51 to a one of the requesting units 42-45 via adaptor circuits 47. This action is useful when one of the requesting units is designated as a primary host and it wants to determine which of the requesting units 42-45 is currently using shared resource 40 without actually causing shared resource 40 to be committed to the primary host. This command also can be used for monitoring the activity of shared resource 40 with respect to a plurality of the requesting units 42-45.

A third command, the RESET command, also shown in FIG. 6, is decoded by command decoder 48 at T1. Decoder 48 activates line 62 enabling reset circuit 54 to reset the busy bit register 50. This command can be viewed as an override control such that if one of the requesting units 42-45 was currently using shared resource 40 and an error occurred in such requesting unit, another requesting unit could issue a RESET command to override the commitment to the failing unit; thereby shared resource 40 is freed for further data processing. Also, the RESET command can be limited to the primary host such that it can override any commitment for priority control of shared resource 40 to any of the requesting units 42-46.

The last command with respect to FIG. 2 is a so-called FREE command. Command decoder 48 in response to receiving such a FREE command, as detailed in FIG. 7, activates line 61 at T0 and simultaneously supplies the ancillary identification data received with the FREE command to cable 49. Line 61 carries the decoded active signal command to compare circuits 55. Circuit 55 compares the signal contents on cable 49 with the signal contents of ID register 51 as supplied over cable 65. When enabled by the line 61 signal, compare circuit 55 supplied an equal or unequal signal over line 67 to AND circuit 57. If there is equality between the ID register 51 and the cable 49 signals, then an active signal on line 67 is passed by AND circuit 57 over line 69 for activating reset circuit 54 to reset busy-bit register 50. This action frees shared resource 40 for subsequent data processing operations. If compare circuits 55 detect an inequality between cable 49 signals and signal contents of ID register 51, then no reset occurs. This action requires a requesting unit 42-45 which is attempting to free shared resource 40 to know the signal contents of register 51. Of course this can be achieved by the previously described READ command.

Other circuits OC 41 also receive decoding commands from command decoder 48, as is well known as a data processing art. Further, shared resource 40 has a connection through other circuits 41 to adaptor circuits 47 which constitute data transfer path between shared resource 40 and the adaptor circuits 47 for enabling transfer of data signals between the requesting units 42-45 and the shared resource 40. This connection also includes tag or other control lines for sequencing the operations of data transfer, as is well known.

Access to shared resource 40 is controlled by OC 41. When an access type command, such as READ DATA, WRITE DATA, DEFINE STORAGE EXTENT, and the like, command decoder 48 enables, by a signal over line 38, compare circuit 55 to compare the cable 49 signal contents (which identify requesting unit 42-45) with the signal contents of ID register 51. If the compare shows equality, then compare circuit 55 supplies an access approval signal over line 37 to OC 41 enabling OC 41 to allow access to shared resource 40. Upon detecting inequality, compare circuit 55 sends an access denial signal over line 37 to OC 41 for blocking access to memory 10. OC 41 then activates command decoder 48 via the illustrated cable connection to activate line 63 to enable AND circuits 56 to send a busy signal with ancillary identification signals from registers 50, 51.

Figure 3:
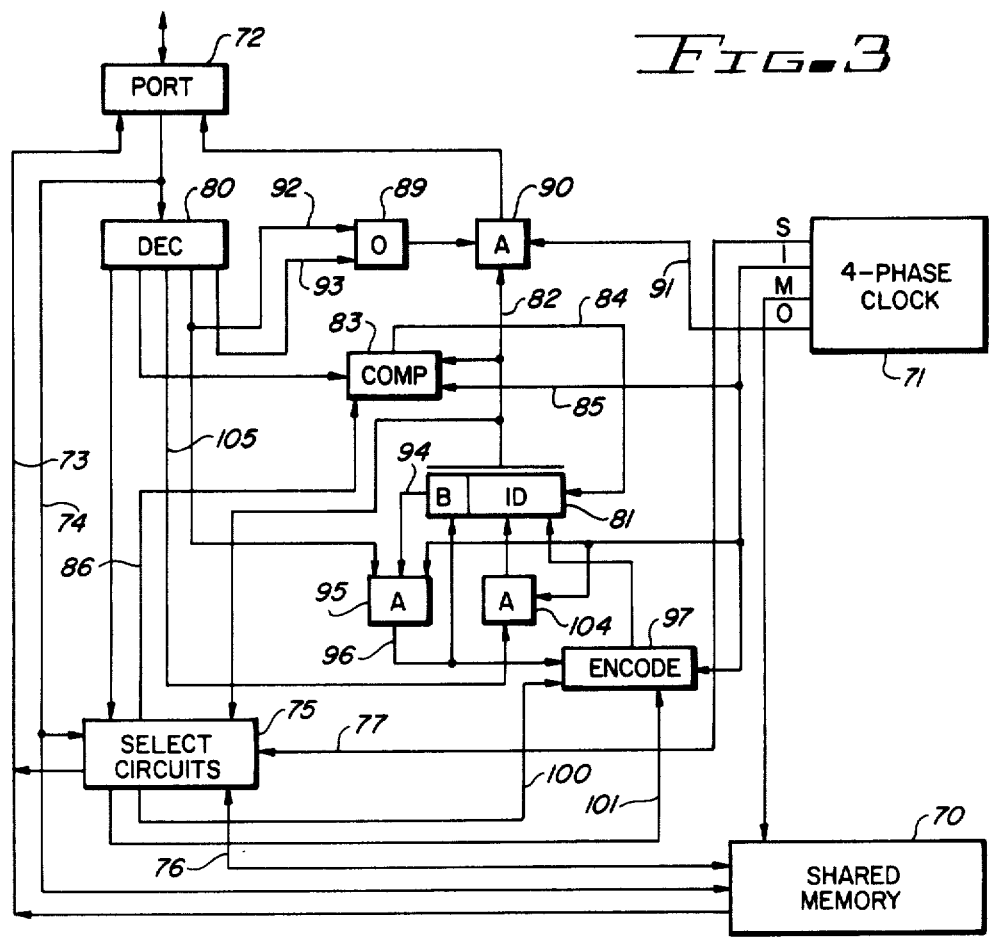
FIG. 3 illustrates a second implementation of the invention which is particularly adapted for supplying current status for queued commands to be executed with respect to a shared resource.

FIG. 3 illustrates an implementation of the invention for queuing commands and supplying queued commands with the status of priority to a remote requesting user. Again, the shared resource is a storage apparatus or shared memory 70 which is timed by a four-phase clock 71 in an usual manner. Four-phase clock 71 provides phase S signals over line 77 for selection of port 72 for accessing memory 70. During phase S, the received address is decoded by select circuits 75 which provide the memory addresses over cable 76 to shared memory 70. The I phase is an input phase which enables signals to be inputted to memory 70 and will be used by the later described circuits to provide the current status along with ancillary identification data to a requesting unit via input/output port 72. Four-phase clock 71 allows pipelined operation of shared memory 70 in a usual manner. The next phase M actuates the shared memory for performing the actual memory reference. The last phase O is an output phase wherein the accessed data is supplied to port 72 for transmission to a user (not shown). Signal transfers between port 72 and shared memory 70 are over cable 73 from memory to port 72 and cable 74 from port 72 to memory 70.

During the selection phase S, port 72 receives command signals from a user (not shown). those command signals are decoded by decoder 80 which supplies control signals to select circuits 75, as is well known. The current status signals for shared memory 70 along with the ancillary identification data signals for the current user and users identified with queued commands are stored in registers 81, which may be a push-down register stack.

Each of the registers 81 contain a busy-bit portion B and an ancillary identification portion ID for containing the ancillary identification data. The signals stored in a one of registers 81, which is the top of the stack of the registers, is continuously supplied over cable 82 to compare circuit 83. Compare circuit 83 also receives decoded output signals from decoder 80 identifying the current requesting user. If ther is a favorable compare between the identified user by decoder 80 and the stored identification in ID portion of register 81 and select circuits 75 have received a command from decoder 80 to erase the signal contents of the top register of stack 81; then comparator 83 supplies a clear signal over line 84 to the top register of stack 81 clearing the status and enabling the signal contents of the next register in the stack of registers 81 to be the current status indicator for shared memory 70. Such new current status and ancillary identification information is supplied by stack 81 over cable 82 to select circuits 75 which then interrupts an appropriate user for indicating that access to shared memory 70 is now available. Compare 83 may be actuated by four-phase clock 71 during phase I by a signal received over line 85.

The signal contents of the top register of the stack of registers 81 are supplied to port 72 for transmission to a requesting user by a set of AND circuits 90 which receive the signal contents of the top register of registers 81 over cable 82. AND circuits 90 are actuated during the fourth phase of four-phase clock 71 by a zero signal received over line 91. The enablement of AND circuits 90 is completed by an output signal from OR circuit 89 which combines signals from decoder 80 for actuating AND circuits 90. When decoder 80 decodes a sense command for sensing the current status of shared memory 70 and for determining the current user identification, decoder 80 supplies an active signal over line 93 for actuating AND circuits 90 during the output phase. This actuation transfers the signal contents of registers 81 to a user by controls not shown. The signal contents of the top register of registers 81 only or the complete queue may be transferred through port 72.

The second line 92 carries an active signal for actuating AND circuits 90. Whenever decoder 80 detects a "READ AND CONDITIONALLY SET" command, the signal contents of the top register of stack 81 is read to the current user. Additionally, the signal on line 92 goes to AND circuit 95 for selectively setting the busy portion B by a signal on line 96 of the top register of registers 81. AND circuit 95 enablement is completed by the I phase of four-phase clock 71 received over line 85 and the not busy signal received from the B portion of the top register of registers 81 over line 94. Additionally, the signal on line 96 from AND circuit 95 actuates encoder 97 to supply new auxillary identification signals to the top register of registers 81 or, in the alternative, shift the signal contents of a next register to the top register of registers 81, as is well known. Encoder 97 is actuated during the I phase by the signal on line 85. The signal contents received from a user over cable 74 and an additional actuting signal received from select circuit 75 over line 101 constitute the input signals for encoder 97. The signal on line 101 is generated by select circuits 75 in response to a command received from decoder 80 and corresponding to the actuation of AND circuit 95.

It may be desired that no new identification data be inserted into registers 81; therefore, select circuits 75 can respond to a READ AND CONDITIONALLY SET command to inhibit further identification data being supplied. Additionally, AND circuit 104 can respond to a decoder 80 supplied signal on line 105 and the I signal on line 85 to clear the signal contents of registers 81. Such a command may include an unconditional reset of all of the circuits in shared memory 70, no limitation thereto intended.

FIGS. 4-11 illustrate a preferred embodiment of the present invention. FIGS. 4-7 illustrate four commands to be executed by a shared resource in connection with the present invention. FIGS. 8-11 show details of apparatus capable of executing the commands set forth in FIGS. 4-7. All of the commands start with the port select step 110. This step corresponds to the selection of a peripheral unit by a central processing unit, a microprogram control unit selection of a peripheral device, and the like, all of which has been described in U.S. Pat. No. 3,400,371. Upon the completion of the selection which corresponds to phase S of the four-phase clock 71 and as used in the preferred embodiment, the individualized phases are executed.

FIG. 4 illustrates the logic flow of the "read resource state" command. This command actuates shared resource apparatus to transmit the present access status together with ancillary identification data to the requesting unit or host. At 111, the input phase is a no operation (NO-OP). At 113, the selected port indicated at 110 receives the signal contents the status register 168 (FIG. 9) which includes the busy state and the current access assignment identification data. This command has now transferred the status of the shared resource to the requesting unit.

FIG. 5 shows a READ AND CONDITIONALLY SET which senses the status of the shared resource and conditionally sets the status to be busy to the requesting unit. Upon completion of the port select step 110, the input phase of a four-phase clock 71 includes branch instruction 114 and busy status setting step 115. The branch at 114 senses whether or not the shared resource is presently busy. If it is not busy, then the step at 115 sets the busy bit and ancillary identification data is updated at 119 by transfer of the port signal contents to the ID register for causing access allegiance of the shared resource to the requesting unit. If the shared resource had been busy at 114, steps 115 and 119 are omitted. There is a no operation step at 116. The signal contents of the status and ancillary identification data registers are transferred to the output port at 113 in the same manner as previously described for FIG. 4.

FIG. 6 illustrates a "reset" command. Following the port select step 110, step 117 erases the status and ancillary identification information from the storage register, such as register 50 of FIG. 2.

The fourth illustrated command of this implementation is the "free resource" command shown in FIG. 7. Following port select at 110, a branch instruction at 118 during the I cycle determines whether or not the requesting unit presently has access control of the shared resource. If not, no action is taken. On the other hand, when the requesting unit has access control of the shared resource, the status signals in register 50 of FIG. 2, for example, are erased at step 117.

Figure 8:
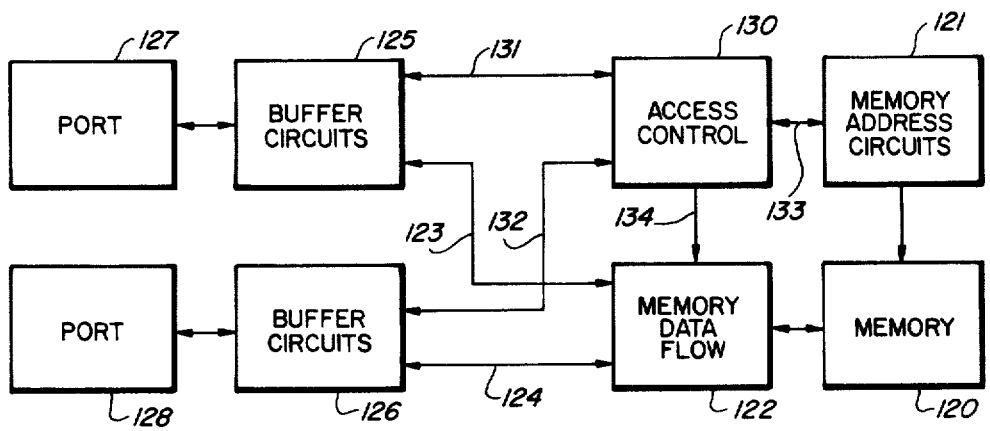
FIG. 8 is a block diagram of a preferred embodiment of the present invention as can be employed with the FIG. 1 illustrated data processing system and particularly showing a shared memory having two acess ports.

FIG. 8 illustrates a shared resource implementing the present invention. Shared memory 120 consists of arrays (not shown) of semiconductors storage elements. Memory address circuits 121 provide access to the arrays using known random access memory addressing techniques. Signals are exchanged with the memory arrays 120 via known memory data flow circuits 122. The data signal flow continues over cables 123, 124, thence through rate changing buffer circuits 125, 126 to ports 127, 128. Buffer circuits 125, 126 can be the usual FIFO (first in, first out) speed changing buffer circuit arrangements. Ports 127, 128 correspond respectively to ports P1, P2 of FIG. 1. The status bits and the ancillary identification data are handled and stored in access control 130. Control 130 communicates with buffer circuits 125, 126 via cables 131, 132. Control 130 is comparable to ACC 15 of FIG. 1. Control 130 sequences the data flow circuits 122 by signals supplied over cable 134 while controlling the addressing circuits 121 via cable 133, all in a usual manner. Access control 130, cables 133, 134 and the interaction with address circuits 121 and data flow 122 can be by microprogram control. For example, cables 133, 134 can be output connections of a microprocessor (not shown) in access control 130. Other implementations are also possible.

While access control 130 includes a lot of timing and other types of control circuits not pertinent to the understanding of the present invention, those portions of access control 130 pertinent to an understanding of the present invention are illustrated in FIGS. 9–11. Such portions include a pair of operation code/decoders 140, 141 comparing favorably to decoder 48 of FIG. 2. Decoder 140 receives its operation codes via port 127 while decoder 141 receives its operation code via port 128 thence buffer circuits 125, 126, respectively. Such connections are illustrated in FIG. 9 by numerals 142 and 143 which respectively are a portion of cables 131, 132 (FIG. 8). The decoders 140, 141 are operated during the input cycle of a four-phase clock 71 of FIG. 3. Accordingly, lines 85 connected to decoder 140, 141 actuate decoders as described for FIG. 3. It is understood that one and only one of decoders 140, 141 is activated at a given time; that is, when port 127 is selected, then decoder 140 is active; when port 128 is selected, only decoder 141 is active.

The control logic for implementing the invention in control 130 is provided by programmable logic array (PLA) 144. PLA 144 is constructed in the usual manner as later described with respect to FIG. 12. PLA 144 includes an AND logic array 145 coupled to OR logic array 146. FIG. 10 illustrates the logical connective arrangement of AND array 145 while FIG. 11 illustrates the logical connective arrangement of OR array 146.

AND array 145 operates in the usual manner as follows. Each of the input lines such as 148, 150, 152, 156, 157 are selectively logically connected to a plurality of so-called "word lines" denominated in FIGS. 10 and 11 by alphabetic numerals A–G. For each word line, a logical connector circuit is indicated by a binary 0 or 1 in FIG. 10. The binary 1 signifies that the true or binary 1 state of the corresponding input lines must be present before an output from AND array 145 is supplied on that word line (A–G). A binary 0 indicates that the absence of such an active or binary 1 state must be present on the input line before AND array 145 supplies an output signal on that corresponding word line (A–G). Taking word line E, for example, an output signal is supplied only when input lines 155 and 157 both have a binary 1 as an input and lines 154 and 156 both have binary 0 inputs. Then and only then will an output signal be supplied. As will become apparent from later descriptions, all of the functions described with respect to FIGS. 4–7 are performed in part by AND array 144.

AND array 144 is connected to OR array 146 by word lines A–G. As shown in FIG. 11, alphabetic numerals A–G correspond to the word lines of FIG. 10 AND array presentation; that is, an output signal from word line E of FIG. 10 corresponds to the input word line E of FIG. 11. The output lines 165, etc. indicated in FIG. 11 are logically connected to the word lines as indicated by R and S symbols. The R symbol means that an output signal from AND array 145 on the corresponding word line A–G will supply a reset signal on the indicated output line. In a similar manner, an S on a word line corresponds to a setting signal being supplied on the indicated output line. Take for example output line 165. Line 165 will receive a resetting signal if any one of the word lines A, F or G carry active signals. On the other hand, line 165 receives a setting signal whenever word lines D and E carry active signals. No action is provided from word line B or C since the period indicates no logical connections. The periods of FIG. 10 also indicate no logic connections.

A reset function by PLA 144 is activated by input line 148 which receives decoded outputs from either decoder 140 or 141 via OR circuit 149. As seen in FIG. 10, input line 148 supplies inputs to word lines A, B and C. Moving to FIG. 11, word line A which has only one input in the AND array supplies reset signals to all of the indicated output lines 165, 166, 167 and 154, 155. This action corresponds to the reset command of FIG. 6. This operation not only resets the status and ancillary identification data stored in register 168, but also resets later described memory elements of PLA 144. Parenthetically, it is noted that output lines 154, 155 of OR array 146 are fed back as input lines to AND array 145.

Output line 165 carries the setting and resetting control signals for the busy status bit B of register 168. It is seen that inputs are received from word lines A and D-G for setting and resetting this bit.

Word line D has inputs from output lines 154, 155 which, as will become apparent, indicate that either bits 1 or 2 of register 168 are active; i.e., provide an exclusive OR indication of activity. In other words, if both bits 1 or 2 of register 168 are 1, the B bit is not affected. This condition is an error condition. Input lines 156, 157 are actuated by the output phase signal received over line 91 from a four-phase clock 71 (as shown in FIG. 3). Inputs to the AND array 145 on lines 156, 157 are received respectively over decode signal carrying lines 162, 163 for read and conditionally set command execution as set forth in FIG. 5. The output signals of AND circuits 160, 161 also travel to OR circuit 170 which actuate register 168 to transmit its signals over cable 171 during the output phase. Line 171 is in turn connected to AND circuits 172, 173 which are respectively actuated by the signals on lines 156, 157 for transmitting the signal contents of register 168 to buffer circuits 125, 126 and thence to ports 127, 128, respectively.

Returning to PLA 144, lines 156, 157 are also logically connected in AND array 147 in an exclusive OR manner. Accordingly, only one port 127 or 128 can be requesting access to shared resource at a given time. This again is an error control feature. Note that the exclusive OR logical connection not only applies to word lines F and G.

Word lines F and G which receive the feedback signals over output lines 154, 155 of OR array 146 are logically connected to word lines F and G for indicating an off state; therefore, word lines F and G signify that bits 1 and 2, are binary 0 and therefore a selection of shared resource on 20 is permissible. The busy bit B of register 168 is reset.

Examining OR array 146, as shown in FIG. 11, the logical connective to line 165 from word lines F and G are reset inputs while word lines D and E provide a set input as referred to above with respect to FIG. 10 description of AND array 145.

Input lines 150, 152, respectively, extending from decoders 140, 141 provide for the selection of the shared resource 120. For example, word line B receives a binary 1 from input line 150 for setting the 1 bit of register 168 for allowing shared resource 120 to be accessed via port 127. In a similar manner, input line 152 has a 1 logical connective to word line C for setting bit 2 of register 168 for enabling port 128 to access shared resource 120. The other inputs to word lines B and C are all zeroes for insuring that there is no duplicate requests; i.e., AND array 145 provides for tie-breaking and error prevention, that line 148 is not carrying a reset signal and that lines 154, 155 indicate that shared resource 120 is not already committed to either of the ports 127, 128. In accordance with all of the above, it is seen that PLA 144 provides all of the functions of setting the status and ancillary identification data in register 168 such as used in the FIG. 1 illustrated system environment.

FIG. 12 illustrates a PLA such as used for PLA 144 for illustrating the actual circuits employed. Arrays 145, 146 are constructed using known PLA techniques. Input lines 174 provide signals to a set of latches 175 which staticize the input signals. Encoder 176 receives the latched signals for partitioning the operations of AND array 145. In the illustration of FIG. 10, no partitioning is used. The connection from AND array 145 to OR array 146 is by cable 177 corresponding to the alphabetically enumerated lines A-G. The output lines of OR array are indicated by numeral 178 going to JK-EOR unit 179.

In the FIG. 11 illustration, all of the outputs are so-called JK outputs which go to a set of JK flip-flops. No exclusive OR functions are provided in FIG. 11. The output signals of the JK logic go to a set of latches 180 which are timed by a timing signal received over line 181. Since the timing of PLA's is well known, this is not further described. Latches 180 in turn provide a second phased signal to latches 182 which receive a timing signal over 183; that is, lines 181 and 183, respectively, carry phases of a two-phase timing clock (not shown) such as widely used in double ranked registers. Latches 182 provide output signals over lines 190 which in FIG. 11 correspond to the list of output lines. Register 168 is a portion of latches 182. Additionally, lines 190 are connected supplied to a set of gates 191 which receive additional information signals over lines 193 for providing exclusive OR function of element 179. The line 192 represents the connection from gates 191. This connection represents the feedback connections of lines 154, 157; corresponding gates 191 are continuously enabled. Additionally, a set of inverters 184 receives a signal from latches 182 to supply output signals over lines 187 via a set of gates 185 actuated by a set of control signals received over lines 186.

In summary, ancillary identification signals accompanying availability status indicating signals uniquely and completely signify to a requesting unit why access is denied. In certain aspects of such availability status, position in access queues can indicate to a requesting unit future availability of a resource enabling more efficient work scheduling in a multiprocessing-multiprocessor data processing environment.

While the invention has been particularly shown and described with reference to preferred embodiments thereof, it will be understood by those skilled in the art that various changes in form and details may be made therein without departing from the spirit and scope of the invention.

What is claimed is:

1. A data storage control for enabling verifiable controlled access to a data storage unit, comprising:
 (a) a plurality of access port means coupled to said data storage unit for enabling access thereto for the storage and retrieval of data signals;
 (b) an access control coupled to each of said access port means for controlling said access such that one and only one of said access port means accesses the data storage unit at a given instant and said access control having a register for storing a busy access-indicating control signal with access identification signals for indicating which of said access port means has current access rights to said data storage unit when and only when said busy control signal indicates a busy state;

(c) access means in said access control and coupled to said register for storing and retrieving signals therein and further coupled to all of said access port means for receiving access requests for accessing said data storage unit via the respective access port means and for setting said register in accordance with said received access requests such that said busy control signal is set on a given access request being received, together with an appropriate access identification signal and for denying access to a first access port means supplying an access request whenever said busy access signal indicates a busy state and the access identification signal does not correspond to said first access port means, read status means in said access control and coupled to said register for storing and retrieving signals therein and to all of said access port means for enabling any of said access port means to read the signal contents of said register for monitoring access status of said data storage unit independent of any of said access requests such that an access port means currently having access to said data storage unit can verify that access and any other access port means not currently having access to said data storage units can monitor another port's access status for ensuring data integrity, read and set means in said access control and being coupled to said register for storing and retrieving signals therefrom and coupled to all of said access port means for receiving a read and set signal from any of said access port means for sensing the busy access signal and access identification signals stored in said register and being responsive to a received read and set signal and to said busy signal indicating a not busy signal to set the busy signal to the busy state and setting an access identification signal in said register corresponding to the access port means supplying such read and set command whereby access to the data storage unit can be established independent of other access requests, reset control means in said access control coupled to said register and to all of said access port means for being responsive to a reset command received from any of said access port means and being responsive to said reset command to reset the contents of said registers to a not busy state and erasing all of said access identification signals irrespective of the current stored signals in said register whereby any of said access port means can reset the access control for facilitating access thereto, and free resource control means in said access control coupled to said register for storing signals therein and retrieving signals in said register and to all of said access port means for receiving a free resource command from any of said access port means and being responsive to said received free resource command to compare the access port means supplying said free resource command with the presently stored access identification signal and if equal to reset the busy signal along with the access identification signal to zero, otherwise indicating an error state; and (d) means in said access control connected to the register for comparing said busy signal with said access identification signal and indicating an error in said access control whenever any of said access identification signals are indicating which of said access port means has current access rights when said busy control signal is set to a non-busy state.

* * * * *